United States Patent [19]
Salonen et al.

[11] Patent Number: 5,470,367
[45] Date of Patent: Nov. 28, 1995

[54] HEATING APPARATUS FOR A GLASS-SHEET BENDING STATION

[75] Inventors: Tauno T. Salonen; Erkki P. J. Yli-Vakkuri, both of Tampere, Finland

[73] Assignee: Tamglass Oy, Finland

[21] Appl. No.: 795,735

[22] Filed: Nov. 21, 1991

[51] Int. Cl.$^6$ .......................... C03B 29/00; C03B 23/00
[52] U.S. Cl. .......................... 65/162; 65/273; 65/DIG. 4; 65/DIG. 13
[58] Field of Search .......................... 65/162, 273, 349, 65/350, DIG. 4, DIG. 13

[56] References Cited

U.S. PATENT DOCUMENTS

| | | | |
|---|---|---|---|
| 3,001,328 | 9/1961 | Berseth | 65/273 |
| 3,744,985 | 7/1973 | Peternel . | |
| 4,528,016 | 7/1985 | Canfield et al. . | |
| 4,601,743 | 7/1986 | Canfield | 65/162 |
| 4,807,144 | 2/1989 | Jochlin et al. | 65/162 |
| 4,952,227 | 8/1990 | Herrington et al. | 65/162 |
| 4,957,532 | 9/1990 | Jacobson et al. | 65/273 |
| 5,053,604 | 10/1991 | Escaravage et al. | 65/162 |

FOREIGN PATENT DOCUMENTS

| | | |
|---|---|---|
| 0078135 | 5/1983 | European Pat. Off. . |
| 78135 | 5/1983 | European Pat. Off. ................. 65/162 |
| 0241356 | 10/1987 | European Pat. Off. . |
| 0376509 | 7/1990 | European Pat. Off. . |
| 0443947 | 8/1991 | European Pat. Off. . |
| 0443948 | 8/1991 | European Pat. Off. . |

*Primary Examiner*—David L. Lacey
*Assistant Examiner*—Steven P. Griffin
*Attorney, Agent, or Firm*—Burns, Doane, Swecker & Mathis

[57] ABSTRACT

The invention relates to a heating apparatus for a glass-sheet bending station. The apparatus includes an array of elongated heating elements, the heating elements being positioned side by side, so as to form a heating element field covering an area of a glass sheet to be bent. A control mechanism is provided for switching heating elements on and off. The heating elements are separately and independently controllable. The heating elements are positioned in succeeding heating element fields in a longitudinal direction of the heating elements. The control mechanism selectively switches on heating elements so as to form at least one heat exchange area that generally covers the area of the glass sheet being bent and that extends at a desired angle relative to the longitudinal direction of the heating elements.

10 Claims, 3 Drawing Sheets

HEATING APPARATUS FOR A GLASS-SHEET BENDING STATION

The present invention relates to a heating apparatus for a glass-sheet bending station, said apparatus comprising an array of elongated heating resistance elements, positioned side by side to develop a resistance field covering the area of a glass sheet to be bent, as well as a control mechanism for switching the resistance elements on and off.

The Applicant's Patent publication U.S. Pat. No. 4,497, 645 discloses a bending furnace, including a bending station in which the present invention can be applied. However, the invention is applicable in all types of glass-sheet bending stations in which a glass sheet is heated by means of electrical resistance elements close to a softening temperature at which a glass sheet can be bent. There can also be more than one bending station, e.g. two or three in succession. In this case, the bending of a glass sheet is effected sequentially in successive bending stations.

When bending e.g. automotive windshields or backlights, it is necessary to localize or focus the heating effect on various sections of the glass in a manner that the glass sheet will be heated more in the areas of vigorous bending lines than in those areas which only require slight bending. Focusing the heat so as to achieve a controlled bending is problematic even in terms of just a single type of glass sheet to be bent. The situation will be particularly problematic when the locations and directions of bending lines also change along with the variations of types of glass sheets to be bent. Efforts have been made to resolve the problem by using maneuverable and re-directable resistance elements (Patent publications EP 335 749 and U.S. Pat. No. 4,726, 832). However, mounting the maneuvering mechanisms in the hot interior of a bending station is a very inconvenient and expensive solution to carry out.

An object of the invention is to resolve the above problem by a novel arrangement and control of resistance elements in a manner that the heating pattern or the local focusing areas of heating can be controlled as desired in terms of their surface area, configuration and direction without maneuvering the resistances.

BRIEF DESCRIPTION OF THE DRAWINGS

The invention will now be described in more detail with reference made to the accompanying drawings, in which.

DETAILED DESCRIPTION OF THE PREFERRED EMBODIMENT

Figure 1:
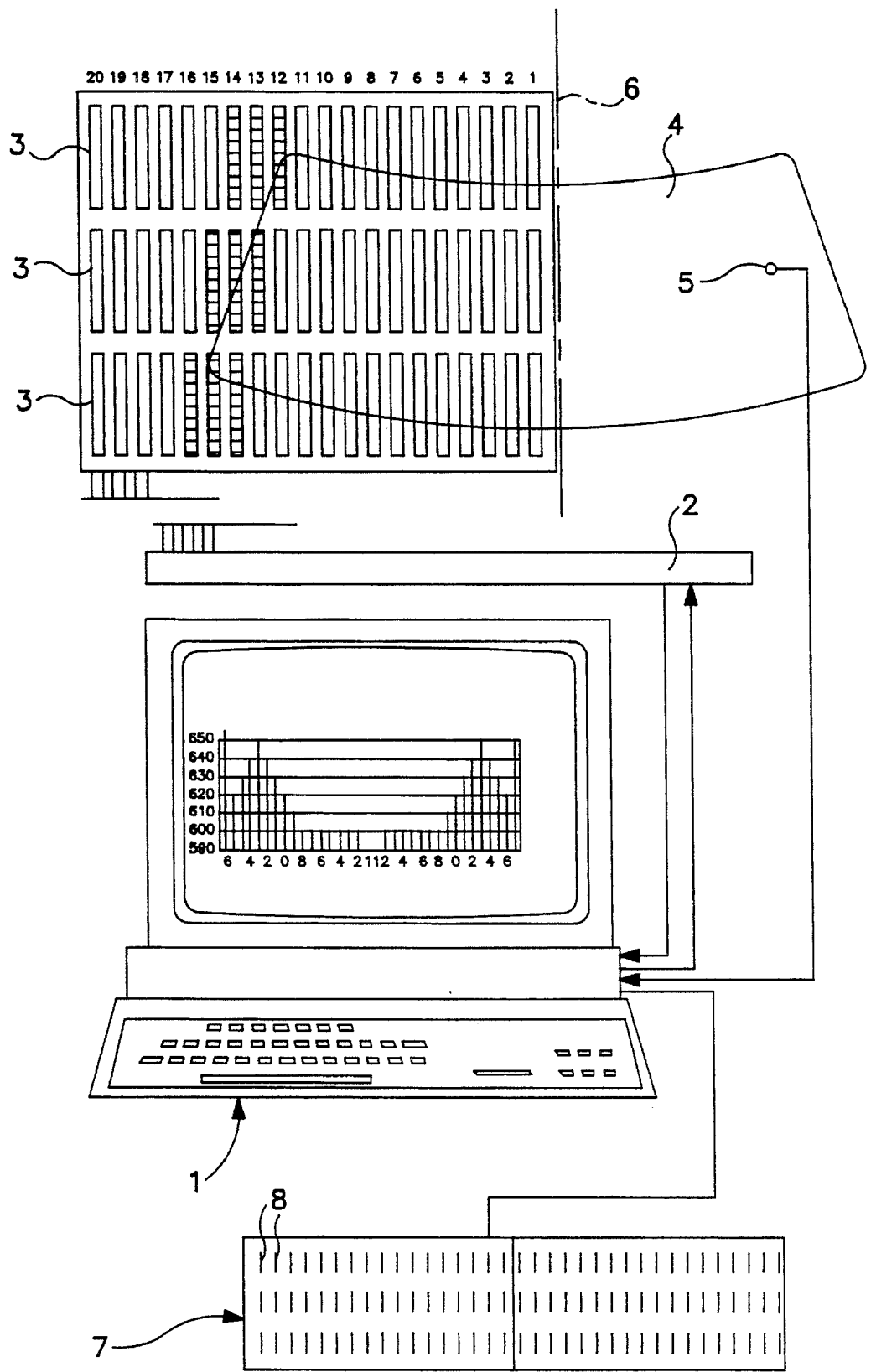
FIG. 1 shows a block diagram of the main components and operation control for an apparatus of the invention.

FIGS. 1–5 illustrate individual resistance elements 3 located on the left-hand side of the centre line 6 of a resistance element field. In the present cases, the number of resistance elements on one half-field is 3×20, i.e. 60 elements. In the longitudinal direction of resistance elements 3 there are three separate resistance elements that can be independently switched on and off. These build up three successive resistance element fields, whose individual resistance elements 3 can be switched on at such a stagger that the resistances switched on in successive fields provide a heating line having a direction different from that of resistance elements 3. The direction of a heating line, i.e. the degree of stagger of resistance elements, can be programmably controlled by employing the staggering of one or more adjacent resistances in successive fields. In addition to this possiblility, it is naturally possible to use other types of switching configurations for resistances; e.g. all resistances can be switched on; resistances of the top and bottom fields can be switched on and the mid-field resistances off or vice versa; and solely the top or bottom field resistances are switched on and the rest off. The various switching configurations or patterns of resistances can be used at various stages of a heating and bending cycle. However, towards the final stage of bending, as a glass sheet begins to bend, it is particularly important that the heating be focused on the bending lines. On the other hand, in order to develop an edge stress in a glass sheet, it is necessary to apply a uniform heating effect to the edges of a bent glass sheet prior to the rapid cooling thereof. The staggering of resistance elements according to the invention also facilitates heating the edge of glass sheets of varying sizes and shapes for developing an edge stress.

The resistance element field is typically located on the ceiling of a bending station and a glass sheet 4 to be bent is brought underneath the resistance field supported on a ring mould. Naturally, the bending mould may also comprise a whole-surface mould or a combination of a ring mould and a partial-surface mould.

Switching said resistance elements 3 on and off is effected by means of a control mechanism, comprising a PC computer 1 and a block 2 which includes a switch on a contactor in a power supply circuit leading to each resistance 3 as well as logic circuits, controlling the switches or contactors and reading the ON/OFF states of individual resistances 3 and informing the process-controlling computer 1 of any given switching pattern of the resistance field.

In a glass bending operation, the temperature of glass 4 is measured by means of one or more pyrometers 5. During a bending operation, the measuring pyrometer will be selected to be the one closest to the major bending point of glass. The obtained measurement reading is supplied to computer 1, wherein it is used as a reference reading for controlling all resistance elements 3. As temperature rises, the only switched-on resistance elements 3 will be those whose respective column extends on the display of computer 1 to above the corresponding temperature limit. Each successive field of resistance elements 3 is provided with its own set of columns (not necessarily shown on the screen), the staggering of the invention being achieved by shifting the position of the tallest columns within the set of columns of successive resistance fields.

A bending program for a certain type of glass can be set up in two ways.
1. A first glass can be bent manually by using a control panel 7, including a switch 8 separately numbered for each resistance for switching individual resistance elements 3 on and off. The completed operations are stored as the bending is finished (teach-in).
2. A bending program is set up by means of the CRT display play and keyboard of computer 1 by making use of a graphical parameters input program.

In both cases, the finished programs are recorded in the hard-disc memory of computer 1 for reading them therefrom for operation, if necessary. The programs can be corrected if necessary either by means of a graphical set-up program or by re-effecting the bending under a manual control.

The control of resistance elements is accelerated and facilitated as they can be controlled as combined in various arrays. Such grouping or arraying lines include:

1. The left- or right-hand side of a bending station
2. The forward, middle or rear section of a bending station
3. The staggering of heating resistance elements in 0, 1, 2 or 3 steps
4. The switching of heating resistance elements in groups or arrays.

These selections of groups or arrays are studied in more detail hereinafter.

Figure 2:
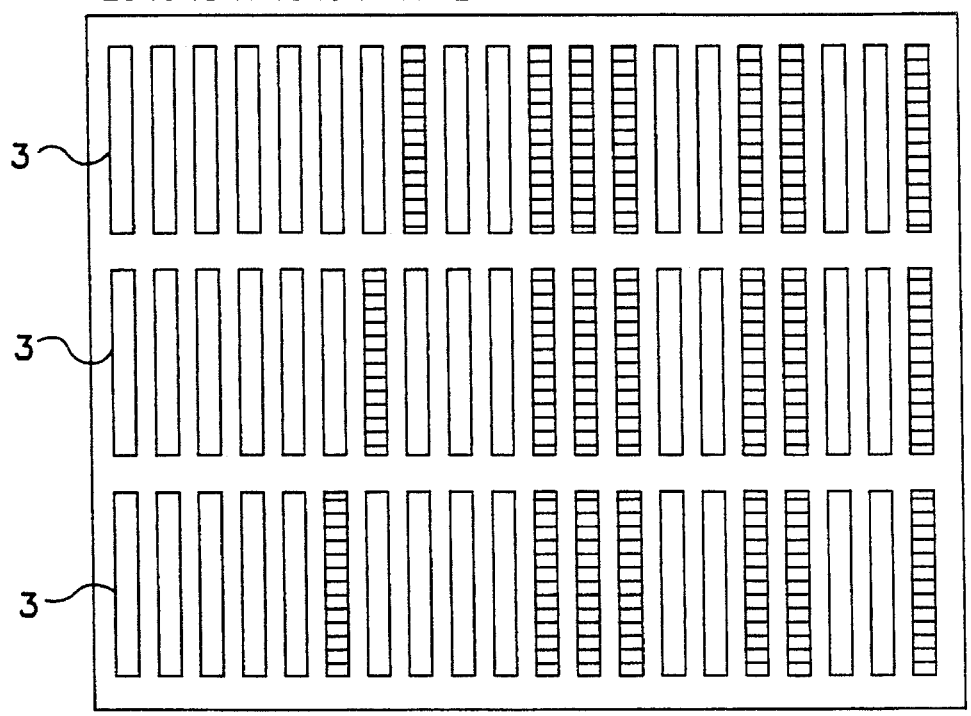
FIGS. 2–5 illustrate various selections for switched-on resistance patterns with a varying surface area, number and direction (stagger) for individual heating lines.
Figure 3:
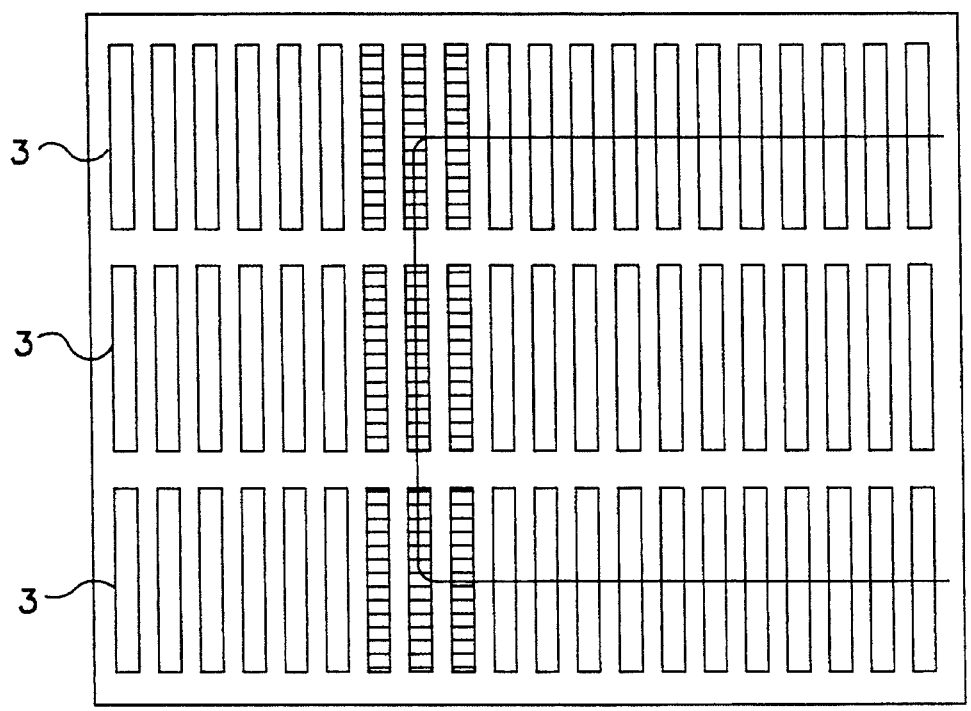
Figure 4:
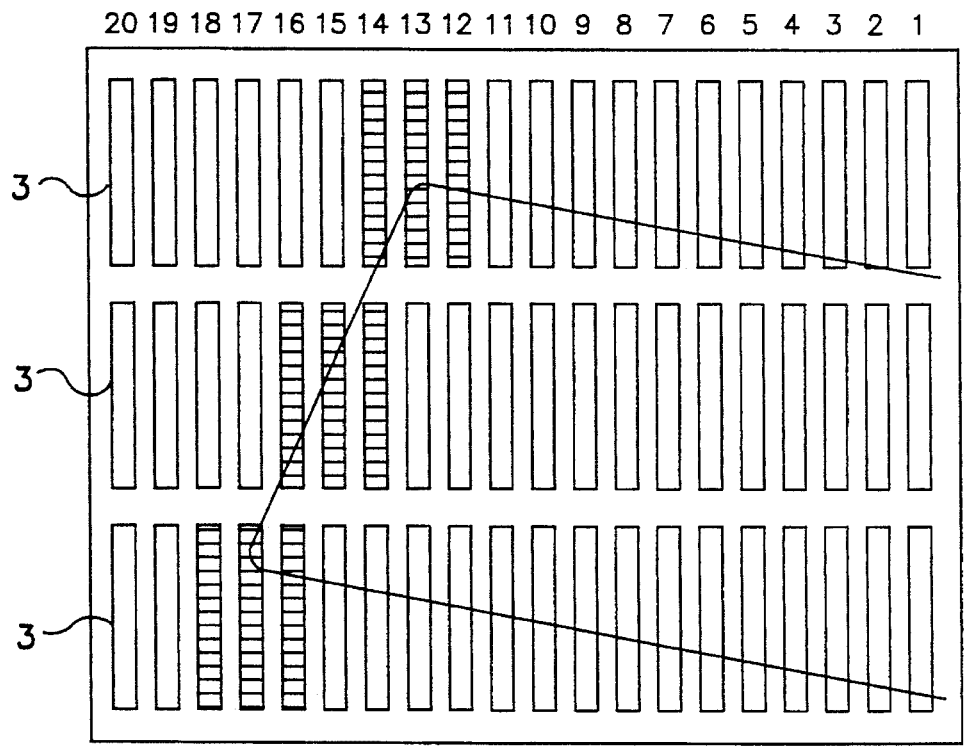
Figure 5:
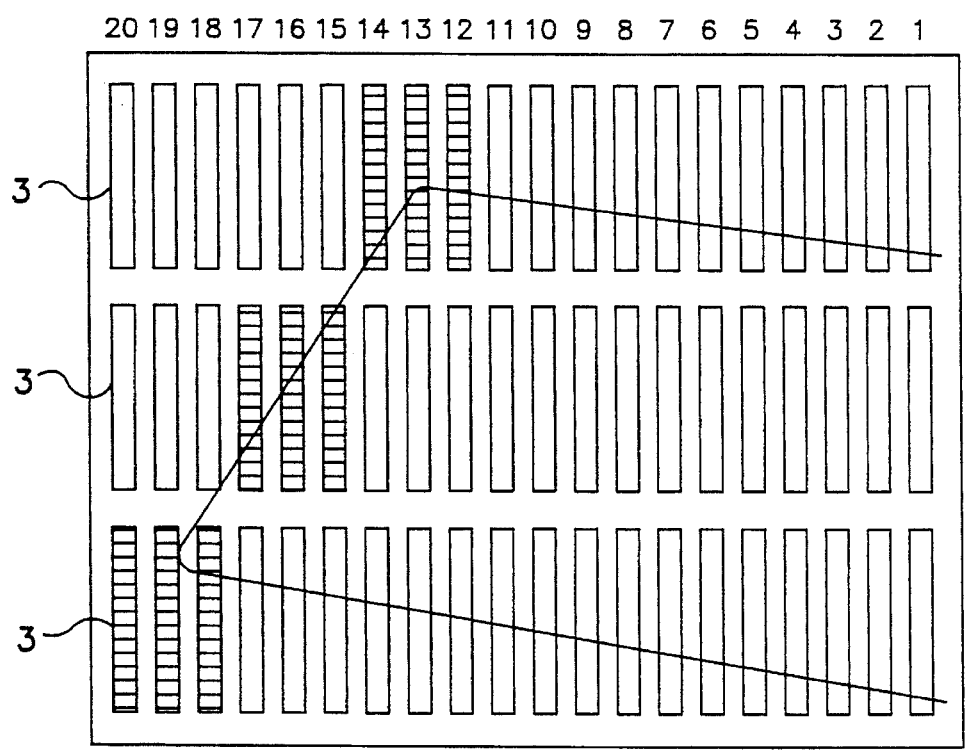

1. Normally, when bending symmetrical glasses, a glass to be bent is placed in the middle of a bending station. In this case, the left- and right-hand side heating resistances 3 of a bending station can be controlled simultaneously. Thus, the group selection "left and right" is set active.
2. Depending on a type of glass to be bent, the group selection "forward, middle or rear section" can be used to provide more bending in the middle, top or bottom edge of a glass.
3. FIG. 2 shows an example, wherein the first array of resistance elements counted from the middle has a direct stepped selection, the fourth and fifth arrays of resistance elements have a direct stepped selection and a fixed selection 2, the eighth, ninth and tenth arrays of resistance elements have a direct stepped selection and a fixed selection 3 and the thirteenth array of resistance elements has a stepped selection 1 and a fixed selection 1. FIG. 3 shows a stepped selection 0, FIG. 4 a stepped selection 2 and FIG. 5 a stepped selection 3.
4. If heating resistance elements 3 are to be switched on or off in the lateral direction of a furnace in larger groups, a group or array can be selected to include two or three adjacent heating resistance elements instead of just one element.

Thus, when applying the invention, each type of glass to be bent is provided with its own resistance-control program which, on the basis of a temperature measured at the bending point, switches on, or more correctly, neglects to switch on a certain number of resistances, the heating lines formed thereby being in the right place and at a suitable stagger for this particular type of glass.

What is claimed is:

1. A heating apparatus for glass sheet bending station, comprising:

an array of heating elements including two or more heating element fields positioned successively in a longitudinal direction of said heating elements, said two or more heating element fields being formed by heating elements positioned side by side such that the heating element fields are adapted to form a heat exchange area covering an area to be bent of a glass sheet, said heating elements being separately and independently controllable to be switched on and off;

a control mechanism including means for selectively switching individual heating elements on and off in successive heating element fields so as to form different heat exchange areas that each generally covers the area to be bent of the glass sheet and that each extends at a different angle relative to the longitudinal direction of the heating elements.

2. An apparatus as set forth in claim 1, wherein said control mechanism includes means for controlling the heating elements such that angles between the heat exchange areas and the longitudinal direction of the heating elements are adjustable.

3. An apparatus as set forth in claim 1, wherein the selective switching means forms adjacent heat exchange areas.

4. An apparatus as set forth in claim 1, wherein the selective switching means forms adjacent heat exchange areas including different numbers of heating elements.

5. An apparatus as set forth in claim 1, wherein said control mechanism includes means for producing heat exchange areas on a left-hand and a right-hand side of a centerline of the heating element fields, wherein the heat exchange areas on the left-hand and the right-hand sides of the centerline are symmetrical.

6. An apparatus as set forth in claim 1, further comprising a pyrometer for measuring the temperature of glass within the apparatus and for providing signals corresponding to the measured temperatures, said pyrometer being electronically connected to said control mechanism such that said control mechanism switches on a predetermined heating element pattern according to temperature signals received from said pyrometer.

7. A heating apparatus for a glass sheet bending station, comprising:

an array of heating elements including a plurality of heating elements arranged in a plurality of longitudinally successive fields in which said heating elements are positioned side by side;

means for controlling the heating of individual ones of said heating elements to heat said heating elements such that different heat exchange areas are formed that each covers an area to be bent of a glass sheet and that each extends at a different angle to a longitudinal direction of said heating elements.

8. The apparatus as set forth in claim 7, wherein said control means includes means for producing adjacent heat exchange areas having different numbers of heating elements.

9. The apparatus as set forth in claim 7, wherein said control means includes means for producing heat exchange areas symmetrically about a centerline of the array.

10. An apparatus as set forth in claim 7, further comprising means for monitoring temperature at various points on glass sheets heated by the apparatus, said monitoring means including means for providing signals corresponding to temperatures at the various points on the glass sheets, said control means including means for producing a desired pattern of heat exchange areas in response to signals from said monitoring means.

* * * * *

UNITED STATES PATENT AND TRADEMARK OFFICE
CERTIFICATE OF CORRECTION

PATENT NO. : 5,470,367

DATED : November 28, 1995

INVENTOR(S) : Tauno T. SALONEN et al.

It is certified that error appears in the above-indentified patent and that said Letters Patent is hereby corrected as shown below:

On the title page, item

[73] Assignee: delete "Tamglass Oy, Finland" and insert therefor --Tamglass Engineering Oy, Tampere, Finland --

Signed and Sealed this

Fourth Day of March, 1997

Attest:

BRUCE LEHMAN

Attesting Officer

Commissioner of Patents and Trademarks